Patented Nov. 6, 1945

2,388,468

UNITED STATES PATENT OFFICE 2,388,468

ORGANIC SULPHUR COMPOUNDS

Jack Compton, Cuyahoga Falls, Ohio, assignor to The B. F. Goodrich Company, New York, N. Y., a corporation of New York No Drawing. Application May 17, 1944,
Serial No. 536,052

6 Claims. (Cl. 260—132)

This invention relates to the preparation of organic sulphur compounds and has as its object to provide new materials for industrial use.

It has long been known that carbon disulphide will react with various organic compounds to produce thio-acids of various kinds. Thus carbon disulphide with primary or secondary aliphatic amines produces salts of substituted dithiocarbamic acids corresponding to the amines, but with tertiary amines carbon disulphide appears not to react at all under ordinary conditions.

I have discovered that, contrary to expectations, quaternary ammonium compounds react with carbon disulphide to form well-defined compounds which appear to be salts of a new type of thio-acid. These new compounds are readily made by the simple mixture of a quaternary ammonium hydroxide with carbon disulphide, two mols of the quaternary ammonium hydroxide and one mol of carbon disulphide entering into the reaction to form the new compound which is apparently a quaternary ammonium salt of a nitrogen-containing thio acid.

The reaction is most readily carried out in an aqueous medium since quarternary ammonium hydroxides are generally prepared in aqueous media and are consequently available as concentrated aqueous solutions. A quantity of such an aqueous solution containing two mols of the quaternary ammonium hydroxide is simply stirred thoroughly with a quantity of carbon disulphide somewhat over one mol to compensate for evaporation losses of this very volatile ingredient. An exothermal reaction promptly occurs and after a few minutes is substantially complete. The product appears as a crystalline solid, which can be isolated, after cooling, by filtration from the water medium and evaporation of any remaining carbon disulphide. The product is somewhat soluble in water, hence the volume of water present during the reaction should be kept to a minimum. Purification is not ordinarily required.

It has not as yet been possible to determine the chemical structure of the product. However, it appears to be a salt of a thio-acid with a quaternary ammonium ion, since it can readily be converted into metal salts containing only half the original quarternary ammonium groups, and since it readily absorbs sulphur to form polysulphides as is characteristic of this type of sulphur compounds.

The quaternary ammonium compounds from which these new products are made may be any of the wide variety of quaternary ammonium hydroxides, containing aliphatic, cycloaliphatic, aromatic, heterocyclic or other organic radicals, like or unlike, on the four valences of the ammonium nitrogen other than that occupied by the hydroxyl group; or even quarternary ammonium salts together with strong alkali to liberate the quaternary ammonium hydroxide. It will generally be preferred to employ quaternary ammonium hydroxides containing only hydrocarbon groups, although substituents of other kinds may be present so long as they are not themselves so reactive with carbon disulphide as to interfere with the desired reaction. For example, the following representative quaternary ammonium hydroxides are suitable: tetramethyl ammonium hydroxide, tetraethylammonium hydroxide, tetrabutylammonium hydroxide, tetrabenzylammonium hydroxide, trimethyl ethyl ammonium hydroxide, trimethyl benzyl ammonium hydroxide, dimethyl dibenzyl ammonium hydroxide, trimethyl phenyl ammonium hydroxide, dimethyl ethanol benzyl ammonium hydroxide, trimethyl dodecyl ammonium hydroxide, dimethyl di-cyclohexyl ammonium hydroxide, methyl dodecyl cyclohexyl benzyl ammonium hydroxide, trimethyl furfuryl ammonium hydroxide, trimethyl tetrahydrofurfuryl ammonium hydroxide, dimethyl piperidinium hydroxide, benzyl pyridinium hydroxide, trimethyl vinyl ammonium hydroxide.

As a specific example of one embodiment of this invention, 500 parts by weight of a 30 to 40% aqueous solution of trimethyl benzyl ammonium hydroxide are mixed with 57 parts of carbon disulphide. The mixture is stirred for about half an hour to assure completion of the reaction and is then cooled to remove the heat of reaction. The product appears as orange-red crystals which are filtered off and dried.

This product may be converted to metal salts by reaction with metal compounds. The zinc salt is easily prepared by dissolving 6 parts of the orange-red crystals described above in 90 parts water and adding an aqueous solution of 1 part zinc chloride to which concentrated ammonia has been added until the initial precipitate just dissolves. The zinc salt immediately precipitates as a light yellow floc which is filtered off and dried. If desired, the treatment of the zinc chloride solution with ammonia may be omitted. Similar salts of other metals may be made by treating the orange-red product described above with water-soluble salts of other metals such as lead, copper, iron, aluminum, nickel, etc.

If the orange-red crystalline product described above is mixed with powdered sulphur, the mixture first becomes tacky and soon liquefies to a brown viscous oil. This action is evidently due to reaction of the crystalline product, which is an organic sulphide, with the added sulphur to form a polysulphide.

Other derivatives of this new product can obviously be made in well-known ways, by reacting the product with organic halides, with aldehydes, or other reactive materials or combinations of materials, or by replacing the basic quaternary ammonium group by other salt-forming organic or inorganic basic groups so as to form other salts of the new thio-acids.

Furthermore, any of the other quaternary ammonium hydroxides referred to above, or even other quaternary ammonium hydroxides, may be used in the same manner as the specific material mentioned in the example, to form similar new compounds when reacted with carbon disulphide, and similar series of derivatives may be made from each of them.

The new products of this invention have been found to be excellent accelerators of vulcanization. For instance, the orange-red crystalline product made from trimethyl benzyl ammonium hydroxide and described above, when mixed with rubber in the proportions of 0.4 part of the new product to 100 parts rubber, together with 5 parts zinc oxide, 3 parts sulphur and 1 part stearic acid and heated to 275° F. for 40 minutes, brings about rapid and complete vulcanization of the rubber to produce a strong and resilient vulcanized rubber article. This product has the particular advantages of being somewhat water soluble, so that it can be used for the vulcanization of liquid latex, and of exerting a pronounced plasticizing influence on the rubber, so that incorporation of pigments and reinforcing fillers is greatly facilitated. The new products may also be used for many other purposes; for instance, as insecticides or fungicides, as an additive to rubber latex to increase the adhesion of the rubber of the latex to textiles, etc. It will sometimes be preferred to employ one or another of the derivatives which can be made from these products rather than the new products as originally produced.

I claim:

1. The organic sulphur compounds produced by the reaction of quaternary ammonium hydroxides with carbon disulphide.
2. The organic sulphur compounds produced by the reaction of tetra-hydrocarbon substituted ammonium hydroxides with carbon disulphide.
3. The organic sulphur compound produced by the reaction of trimethyl benzyl ammonium hydroxide with carbon disulphide.
4. Metal salts produced by a reaction of a water-soluble metal salt with a solution of the organic sulphur compounds produced by the reaction of quaternary ammonium hydroxides with carbon disulphide.
5. The zinc salt produced by a reaction of a water-soluble zinc salt with a solution of the organic sulphur compound produced by the reaction of trimethyl benzyl ammonium hydroxide with carbon disulphide.
6. The method of making organic sulphur compounds which comprises reacting quaternary ammonium hydroxides with carbon disulphide.

JACK COMPTON.